United States Patent

[11] 3,569,662

| [72] | Inventor | Alan John Thomas |
| --- | --- | --- |
| | | Skipton, England |
| [21] | Appl. No. | 752,291 |
| [22] | Filed | Aug. 13, 1968 |
| [45] | Patented | Mar. 9, 1971 |
| [73] | Assignee | Rolls-Royce Limited |
| | | Derby, England |
| [32] | Priority | Aug. 24, 1967 |
| [33] | | Great Britain |
| [31] | | 39072/67 |

[54] CONTROL APPARATUS FOR USE WITH AN ELECTRIC MOTOR
6 Claims, 3 Drawing Figs.

[52] U.S. Cl. .................................................... 219/124, 318/305
[51] Int. Cl. ..................................................... B23k 37/04, H02p 7/06
[50] Field of Search ........................................... 318/20.430, 305, 329; 330/29; 219/124, 125, 159; 318/341, 39, 12, 6

[56] References Cited
UNITED STATES PATENTS

| 2,600,988 | 6/1952 | Greene et al. ............... | 318/12 |
| --- | --- | --- | --- |
| 2,917,693 | 12/1959 | Cail ............................. | 318/20.120 |
| 3,419,777 | 12/1968 | Asseo .......................... | 318/338 |
| 2,897,427 | 7/1959 | Bradburn, Jr. ............... | 318/329X |
| 3,239,644 | 3/1966 | Nyborg et al. ............... | 219/159X |

Primary Examiner—Oris L. Rader
Assistant Examiner—Robert J. Hickey
Attorney—Cushman, Darby & Cushman ABSTRACT: Control apparatus e.g. for welding machines, for use with an electric motor includes a circuit having a negative feedback amplifier of adjustable input amplitude and gain, its output being passed to the motor to control its rotational speed. The input side of the circuit has a variable resistor and a potentiometer the settings of which determine the rotational speed of the motor. In an alternative, the amplifier output drives a meter, the input voltage being derived from a tachogenerator driven by the motor and being thus proportional to motor speed.

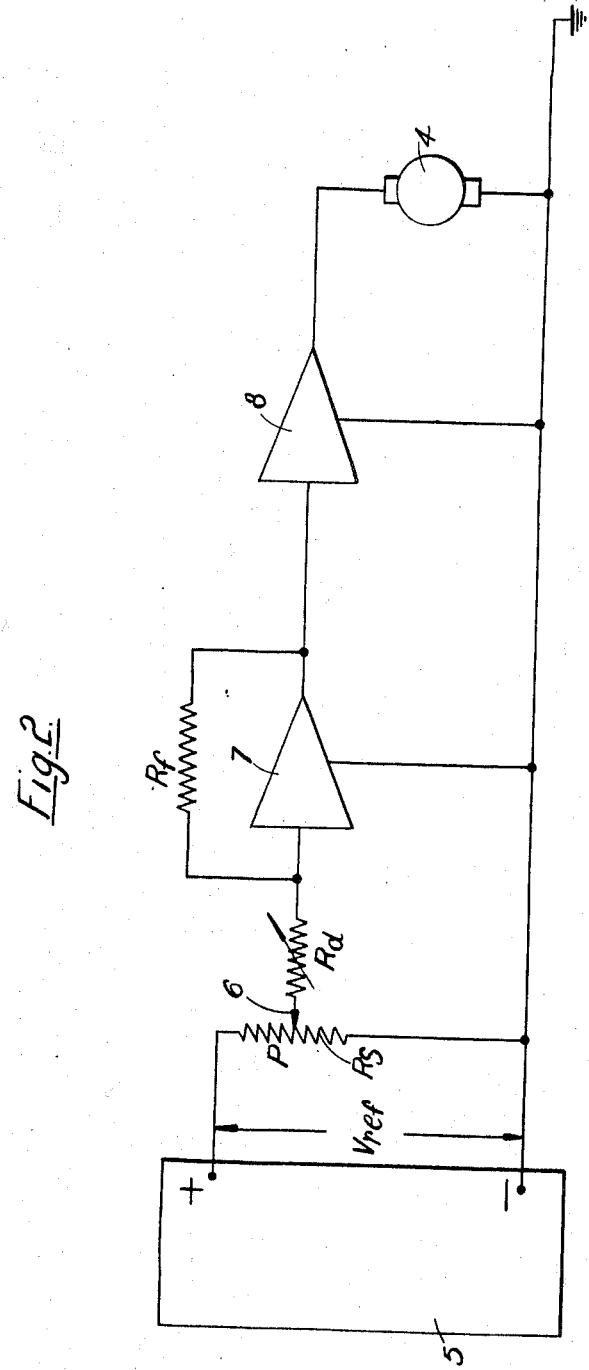

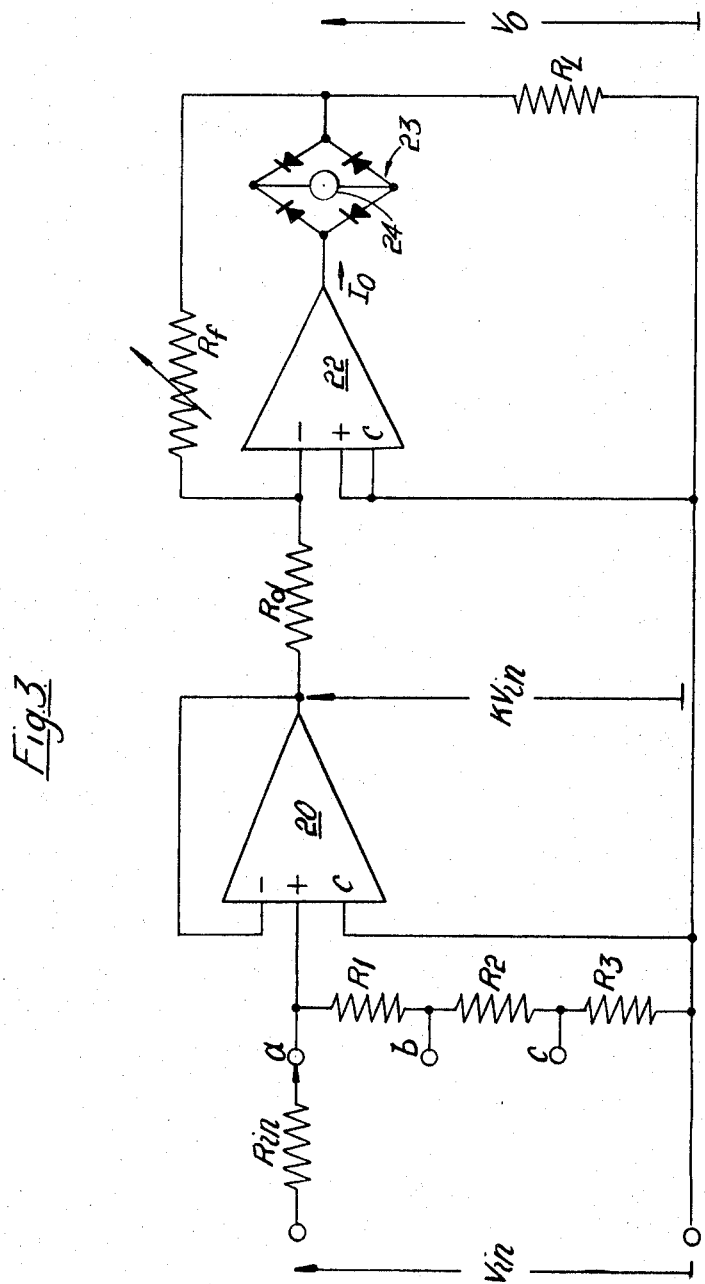

CONTROL APPARATUS FOR USE WITH AN ELECTRIC MOTOR

This invention relates to control apparatus for use with an electric motor.

It is frequently desirable to control the rotational speed of an electric motor such that the circumferential speed of a body attached to the motor at a given radius from its axis of rotation has a predetermined value. Mathematical tables are available for indicating the rotational speed necessary to provide a given circumferential speed at a given radius, but the present invention enables the requisite rotational speed to be set without recourse to the use of tables or other calculating aids.

According to the present invention in its broad aspect there is provided control apparatus for use with an electric motor is adapted to drive a rotary body, comprising an electric circuit for supplying power to said motor, said circuit including an operational amplifier of the negative feedback type, said operational amplifier having an input and an output, first and second variable circuit elements, the gain of said operational amplifier being adjustable in accordance with the setting of said first variable circuit element and its input amplitude being adjustable in accordance with the setting of said second variable circuit element, the output of said operational amplifier being passed to the motor whereby the rotational speed of said motor, in operation, is controlled so that a point on the rotary body at a desired distance from its axis of rotation, which desired distance is selected by adjustment of said first variable circuit element, moves at a desired linear speed selected by adjustment of said second variable circuit element.

Preferably the first variable circuit element comprises a variable resistance connected in series in the input line to the amplifier, such that the gain of the amplifier is inversely proportional to the magnitude of said resistance. Thus the setting of said variable resistance will be representative of the given radius at which the said circumferential speed is to have said predetermined value. A fixed feedback resistor may be connected between the output and input of the amplifier.

The second variable circuit element preferably comprises a potentiometer connected across a stabilized potential source, the input to the amplifier being taken from the variable arm of said potentiometer.

In another embodiment of the invention, there is provided control apparatus for use with a prime mover which is connected to drive a rotary body and which is provided with means for producing an electrical signal functionally dependent upon the rotational speed of the rotary body, said apparatus comprising an electrical circuit adapted to receive said electrical signal, an operational amplifier of the negative feedback type in said circuit, said operational amplifier having an input and an output, a variable circuit element for adjusting the gain of said operational amplifier, and a meter connected to receive an output signal from said operational amplifier, whereby the reading of the meter is indicative of the linear speed of a point on the rotary body at a desired distance from its axis of rotation, which desired distance is selected by adjustment of said variable circuit element. The operational amplifier may then have a variable feedback resistance constituting the said first, or the said variable circuit element.

Preferably an output load resistor is connected to the output of the operational amplifier through a rectifying bridge, the feedback resistance being connected between the junction of the output load resistor and the rectifying bridge and the input to the operational amplifier. A meter may be connected across the rectified voltage output terminals of the rectifying bridge.

The invention finds particular application in the control of electric motors used to drive rotary workpieces in welding operations. When effecting a line weld on a workpiece along a circular arc, the rotational speed of the workpiece has to be such that the rate of advance of the weld along the circular path has a predetermined value, suited to the welding process and the material of the workpiece. By using apparatus according to the present invention to control the motor which drives the workpiece, it is possible to preset on said variable circuit elements the predetermined circumferential speed (that is, the welding speed) and the radius at which the weld is to be effected, the rotational speed of the motor then being such as to give the requisite welding speed.

The present invention therefore also includes a welding machine comprising apparatus as set forth above for supporting a workpiece for rotation relative to a fixed welding head. Means may be provided for controlling the energization of the welding head automatically in accordance with the angular position of the workpiece relative to the head.

The welding head in a preferred application of the invention is an electron beam welding device.

The invention will be described, merely by way of example, with reference to the accompanying drawings, in which:

FIG. 2 is a schematic circuit diagram of apparatus according to one embodiment of the invention for controlling a workpiece-driving motor in the welding machine of FIG. 1; and FIG. 3 is a schematic circuit diagram of apparatus according to another embodiment of the invention.

Figure 1:
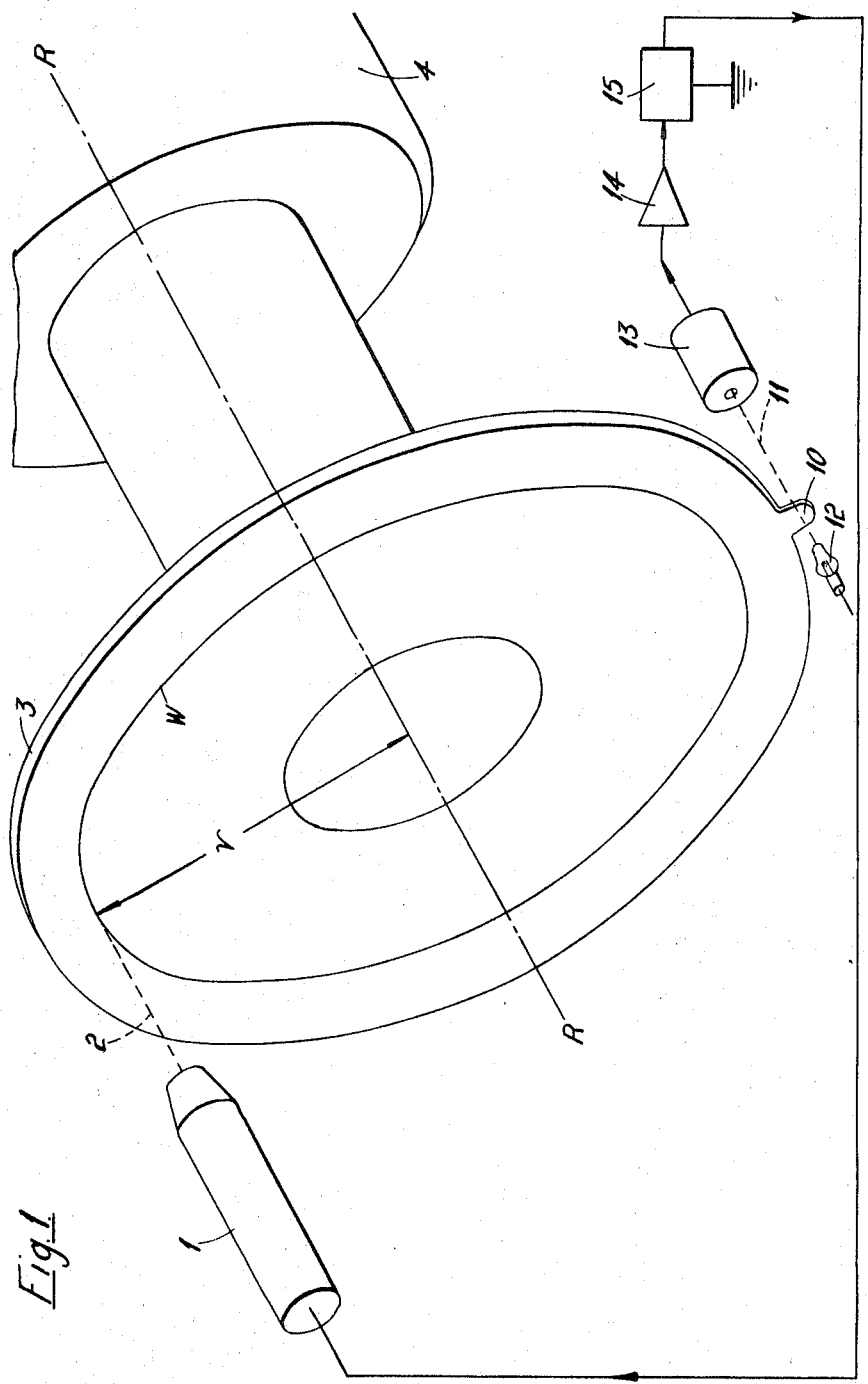
FIG. 1 illustrates, purely diagrammatically, an electron beam-welding machine for welding a rotary workpiece.

The welding machine shown diagrammatically in FIG. 1 includes a fixed welding head 1 comprising an electron beam welding device of known type. This device when energized produces a narrow electron beam 2, indicated in broken lines, which is directed on to the surface of a workpiece 3 on which welding is to be effected. The workpiece 3 is mounted for rotation about an axis R-R relative to the welding head 1. The lateral position of the welding head 1 relative to the axis of rotation R-R may be adjusted so that the point of impingement of the electron beam 2 on the surface of the workpiece 3 may be disposed at a given radius $r$ from the axis of rotation R-R. As the workpiece 3 rotates, the point of impingement of the electron beam 2 on the surface of the workpiece describes a circular arc and effects an arcuate line weld W on the workpiece 3. Rotation of the workpiece 3 about the axis R-R is effected by means of an electric motor 4.

For a given workpiece material and welding beam intensity the rate of movement of the welding beam 2 over the surface of the workpiece 3 should have a predetermined value for satisfactory welding. The circumferential speed of the workpiece 3 at the radius $r$ must therefore equal this predetermined welding speed, which may typically be between 5 and 120 inches per minute. It is therefore necessary to control the rotational speed of the motor 4 to achieve this circumferential speed. Since, for a given rotational speed, the circumferential speed at the radius $r$ is directly proportional to the radius $r$, the control of the motor speed must take into account both the desired circumferential speed and the given radius $r$.

One form of control circuit for the motor 4 is shown schematically in FIG. 2. The control circuit includes a stabilized direct current power source 5 which produces DC power at a stabilized output voltage $V_{ref}$.

A potentiometer P is connected across the positive and negative output terminals of the source 5, the potentiometer having a movable pickup arm 6 which is connected to the input of an amplifier 7 through a series variable resistance $R_d$. Thus the input voltage applied to the amplifier 7 is determined by the respective settings of the potentiometer P and variable resistance $R_d$. The variable resistance $R_d$ could, in practice, comprise a bank of fixed resistors of different value which may be switched into the circuit by suitable switching means.

The amplifier 7 is of conventional type having a high gain (for example of the order of $10^5$) with high negative feedback provided by a fixed resistor $R_f$ connected between its output and input.

The gain $G$ of the amplifier 7 may be expressed, to a high degree of accuracy, as:

$G = -R_f/R_d$

The output voltage $V_{out}$ of the amplifier 7 may therefore be written as:

$V_{out} = -R_f/R_d \times V_{in}$, where $V_{in}$ is the input voltage $= -R_f/R_d \times V_{ref} \times R_s/R$, if $R_s \ll R_d$ That is, $$V_{out} = \frac{R_f R_s}{R_d R_p} \cdot V_{ref}$$

where $R_s$ is the (variable) resistance between the negative terminal of the source 5 and the variable arm 6 of the potentiometer P, and $R_p$ is the total resistance of the potentiometer P. In practice $R_s \ll R_d$, or, failing this, an impedance transformer is interposed between P and $R_d$ so that changes in $R_s$ do not modify the effective value of $R_d$.

It will be seen that the output voltage $V_{out}$ is directly proportional to the value of the resistance $R_s$ and inversely proportional to the value of the resistance $R_d$. The output of the amplifier 7 is passed to the motor 4 through a power amplifier 8, which is connected to a power supply (not shown) of the motor 4. The rotational speed of the motor 4, which is dependent on the voltage applied thereto, will therefore, depend on the respective settings of the potentiometer P and the variable resistance $R_d$.

The variable resistance $R_d$ constitutes a first variable circuit element the setting of which determines the gain of the amplifier 7 and, since the rotational speed of the motor 4 is inversely proportional to the value of the variable resistance $R_d$, the latter may be graduated directly in terms of the radius $r$ (or diameter $2r$) of the required arcuate weld. Thus a value of the resistance $R_d$ is selected in accordance with the given radius $r$ of the arcuate weld W.

The potentiometer resistance $R_s$ constitutes a second variable circuit element the value of which determines the input amplitude to the amplifier 7. Since the rotational speed of the motor 4 is directly proportional to the resistance $R_s$ set upon the potentiometer P, the latter is graduated in terms of different circumferential speeds, that is, in terms of different welding speeds in this particular application.

In use of the apparatus the radius $r$ (or diameter $2r$) of the arcuate weld W is set upon the variable resistance $R_d$ and the predetermined welding speed is set upon the potentiometer P. The rotational speed of the motor 4 is then such that the arcuate weld proceeds at the predetermined rate.

When effecting a completely circular weld on a workpiece 3, as illustrated in FIG. 1, it is desirable to start and stop the rotation of the workpiece 3 automatically. To this end the workpiece 3 is provided, in this example, with a projecting element 10 which, at a given angular position of the workpiece 3 relative to the welding head 1, interrupts a narrow light beam 11 (shown in broken lines) passing between a source 12 and a photoelectric detector 13. The output of the photoelectric detector 13 is passed through an amplifier 14 to a welding control circuit 15 which in turn controls the supply of energizing current to the welding head 1. The arrangement is such that, when the beam 11 is first interrupted by the projecting element 10 at the start of a welding operation the circuit 15 energizes the welding head 1 and welding proceeds under control of the circuit shown in FIG. 2, as described above. When the complete circular weld W has been completed, the beam 11 is again interrupted by the projecting element 10 and the signal from the photoelectric detector 13 causes the circuit 15 to deenergize the welding head 1.

The circuit 15 for controlling the energization of the welding head 1 may include means for modifying, in a predetermined manner, the rate of growth and rate of decay of the intensity of the electron beam 2 from the welding head 1 so as to avoid "end effects" at the start and finish of the welding operation.

The apparatus according to the present invention is particularly suitable for effecting arcuate welds on circular disclike workpieces 3 such, for example, as rotor discs for gas turbine engines. For such workpieces the diameter of the weld effected may typically be of the order of 2 feet.

A circuit of a second embodiment of the invention is shown in FIG. 3 for use when a speed controller is already fitted to a motor 4 which may be of any kind, including that shown in FIG. 1, in a welding (or other) machine. Given that the existing speed controller has proportional feedback from, say, a tachogenerator, then the feedback voltage $V_{in}$ is processed in an amplifier and the output used to drive a meter, the feedback constants of the amplifier being adjusted in accordance with the required diameter. The circuit is a DC circuit and is a purely indicating, rather than control circuit, and has a series input resistance $R_{in}$ and three series-connected range-changing resistors $R_1$, $R_2$, $R_3$ connected across the input to a unity gain noninverting amplifier 20, the input connection to the amplifier 20 being made through the resistance $R_{in}$ across $R_3$ alone (terminal $c$), $R_2 + R_3$ in series (terminal $b$), or $R_1 + R_2 + R_3$ in series (terminal $a$) as required to change the range. The amplifier 20 is differentially connected and has an open loop gain of the order of $10^5$. The input impedance $Z_{in}$ of the amplifier 20 is very high, that is:

$$Z_{in} \gg R_1 + R_2 + R_3$$

Thus shunting of $R_1$, $R_2$ and $R_3$ by the amplifier 20 is minimal. The output impedance $Z_{out}$ of the amplifier 20 is very low, that is:

$$Z_{out} \ll R_d$$

where $R_d$ is the effective series resistance in the output line of the amplifier 20. Thus the amplifier 20 has a negligible effect on the value of $R_d$.

The amplifier 20 is followed by an inverting amplifier 22 having a variable feedback resistor $R_f$, the amplifier 22 feeding an output load resistor $R_L$ through a rectifying bridge 23. The feedback resistor $R_f$ is connected between the junction of the bridge 23 and the load $R_L$ and the input of the amplifier 22. A meter 24 is connected across the rectifying bridge 23. This arrangement provides unidirectional deflection of the meter, the deflection being the average value of the current flowing.

Since the rectifying bridge 23 is within the closed loop of the amplifier 22, diode nonlinearity is substantially removed and the circuit displays good linearity.

For a given motor speed, the welding speed for a workpiece 3 is directly proportional to the diameter $d$ of the weld. Therefore by adjusting $R_f$ in accordance with the diameter $d$, the meter 24 can be made to indicate actual weldspeed.

The output current $$I_0 = \frac{V_0}{R_L} \quad (R_f \gg R_L)$$

The amplifier 22 has a closed loop gain, established by the resistors $R_d$ and $R_f$, of $G = -R_f/R_d$ $$\therefore I_0 = \frac{K V_{in} R_f}{R_d \times R_L}$$

i.e. $I_0 = \frac{-K}{R_d R_L} \cdot R_f \cdot V_{in}$

Thus the reading of the meter 24, which is indicative of the weld speed, is proportional to $R_f$ and proportional to the input voltage $V_{in}$, $R_f$ being representative of the workpiece diameter $d$ and $V_{in}$ of the speed of the motor 4.

The constant of proportionality $$\frac{-K}{R_d R_L}$$

is determined by the values of $R_d$, $R_L$ and the potentiometer constant $K$, the latter having three different values depending on which of the terminals $a$, $b$, or $c$ the input is connected to:

$$K_a = \frac{R_1 + R_2 + R_3}{R_{in}}$$

$$K_b = \frac{R_2 + R_3}{R_{in} + R_1}$$

$$K_c = \frac{R_3}{R_{in} + R_1 + R_2}$$

The three values of $K$ indicate three separate ranges; there can of course be any number of ranges.

I claim:

1. A welding machine comprising a welding head, an electric motor adapted to support a rotary workpiece which is to be welded by the welding head along a circular line whose radius from the axis of rotation of the motor may be varied, an electric circuit for supplying power to said motor, said circuit including an operational amplifier of the negative feedback type, said operational amplifier including an input means and an output means, and said operational amplifier including first and second variable circuit elements which are respectively calibrated to indicate a range of values of the said radius and a range of linear speeds of the workpiece at said radius, the gain of said operational amplifier being adjustable in accordance with the setting of said first variable circuit element and its input amplitude being adjustable in accordance with the setting of said second variable circuit element, said output means being adapted to couple the output of said operational amplifier to the motor.

2. Machine as claimed in claim 1 in which there are means for controlling the energization of the welding head automatically in accordance with the angular position of the workpiece relative to the head.

3. Machine as in claim 1 in which the first variable circuit element comprises a variable resistance connected in series with said input means to said operational amplifier in a manner such that the gain of the operational amplifier is inversely proportional to the magnitude of said resistance.

4. Machine as claimed in claim 3 in which a fixed feedback resistor is connected between said output means and said input means of the operational amplifier.

5. Machine as claimed in claim 1 including a stabilized potential source, said second variable circuit element comprising a potentiometer with a variable arm and connected across said stabilized potential source, the input to said input means of said operational amplifier being taken from the variable arm of said potentiometer.

6. Machine as claimed in claim 1 in which a power amplifier is connected between the operational amplifier and said motor.